May 24, 1927.

H. J. POOLE 1,630,216

EVACUATION AND SEALING OF TINS AND THE LIKE METALLIC CONTAINERS

Filed Oct. 1, 1921

Inventor
Henry J. Poole
By
Attorney

Patented May 24, 1927.

1,630,216

UNITED STATES PATENT OFFICE.

HENRY JEFFREY POOLE, OF LONDON, ENGLAND.

EVACUATION AND SEALING OF TINS AND THE LIKE METALLIC CONTAINERS.

Application filed October 1, 1921, Serial No. 504,768, and in Great Britain June 25, 1921.

This invention relates to the evacuation of tins or other wholly or partly metallic air-tight vessels, and in particular to the method of sealing the tins or the like when evacuation has been effected.

In a co-pending application Serial No. 444,815 filed 14 February 1921 there is described a method of sealing the evacuation pinholes in tins or other metallic or partly metallic containers, according to which the suction during evacuation is utilized to hold a sealing disc of very thin paper or equivalent material in position ready for sealing the pinhole automatically upon the vacuum being broken, the sealing disc being permanently affixed over the pinhole by a suitable adhesive.

According to the present invention, which is a modification of the invention described in the above mentioned specification, instead of using a disc of thin paper or the like for closing the evacuation pinhole, a thin metallic disc is substituted and this disc is permanently affixed over the pinhole by soldering.

The sealing disc, which may be of lead foil or of tin or copper or other metal or alloy suitable for the purpose, is placed in position over the pinhole prior to the evacuation of the air and is held by suction during evacuation, in the manner described in the afore-mentioned specification, against the face of a spring-urged plunger by which it is pressed over the pinhole to close the latter when the vacuum is broken, the metallic disc being then permanently affixed in this position by a drop of molten solder or the like. Alternatively, the disc may be of a solder alloy or one or both of the surfaces to be sealed together may be prepared beforehand by covering it or them with a film of solder so that the disc may be permanently affixed, after the vacuum is broken, simply by the application of heat.

Figure 2:
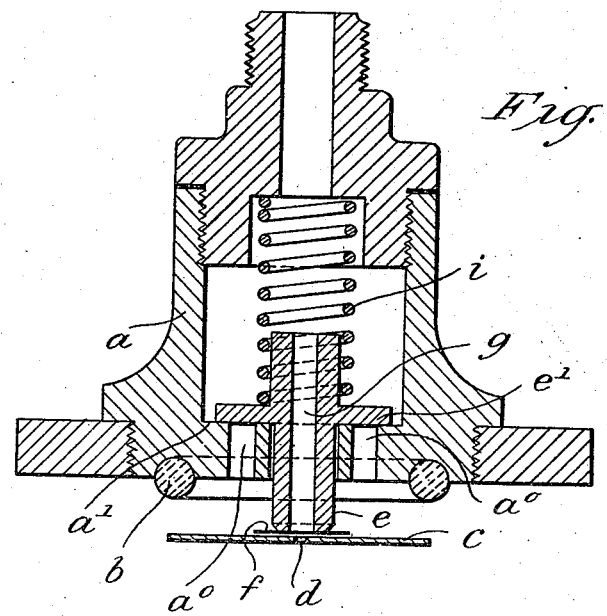
Figure 1:
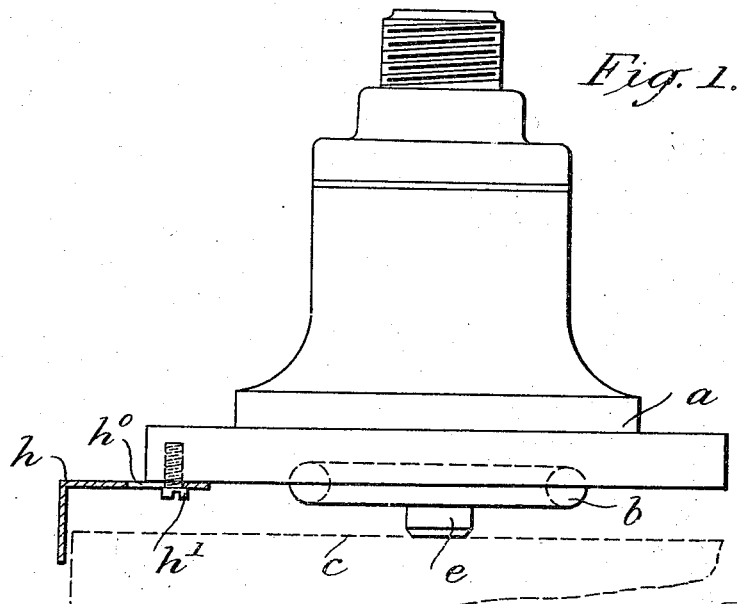

An apparatus suitable for carrying the invention into practice comprises a specially formed suction nozzle, shown in elevation in Fig. 1 and in longitudinal section in Fig. 2 of the accompanying drawings which show the apparatus prior to or after evacuation of the air, the nozzle being connected with an evacuating device such as, for example, any suitable kind of mechanical pump and vacuum chamber, this nozzle $a$ having a luting ring $b$ preferably of india rubber, which is pressed against the wall $c$ of the tin so as to include the pinhole $d$, and a spring-urged plunger $e$ centrally arranged, the function of which is to press the thin metallic disc $f$ upon the surface of the vessel over the hole $d$ so as to seal the latter automatically when the pump is cut off or the vacuum is broken.

The plunger $e$ has a central aperture $g$ extending axially through it and a collar $e'$ which is seated under the action of the spring $i$ on an internal shoulder $a'$ of the nozzle $a$ so as to close the nozzle aperture $a°$. When the nozzle is applied by hand to the tin with a sealing disc $f$ in position over the pinhole and the luting ring $b$ pressed down into close contact with the tin and the connection with the exhausting device established, the consequent reduction of pressure in rear of the collar valve $e'$ causes the plunger $e$ to be withdrawn against the force of the spring $i$ and with it the sealing disc $f$ which is held by suction against the face of the plunger, the pinhole $d$ being consequently uncovered to permit evacuation of the tin. When the evacuation of the tin is completed the vacuum within the nozzle is broken, whereupon the sealing disc is instantly pressed over the pinhole by the spring-urged plunger $e$ and by the pressure of the atmosphere and seals the hole.

The nozzle may have attached to it a guiding device indicated at $h$ (Fig. 1) for centralizing the tin or other container to be evacuated, so as to ensure the registration of the plunger $e$ with the pinhole $d$, and this guide may be adjustably secured, as by means of setscrews $h'$ passing through slot $h°$ in the guide and screwed into the nozzle flange, to suit different sizes and shapes of tins or may be interchangeable with others adapted for tins of different shapes and sizes.

If the sealing disc is of a readily fusible material such as lead or tin foil, it may be permanently affixed in the sealing position by fusion to the tin or the like by means of a drop of molten solder. Otherwise the surface of the container around the pinhole and the surface of the sealing disc in contact therewith may be prepared beforehand by covering them with a film of solder so that the disc may be affixed, after the vacuum is broken, simply by the application of heat; or the disc may be permanently fused to the tin by electric or other autogenous welding process.

Having thus described the nature of the said invention and the best means I know of carrying the same into practical effect, I claim:—

A method of sealing the evacuation pinholes in tins or other metallic or partly metallic containers, which comprises holding a metallic disc in a position opposite to the pinhole and ready for sealing, by suction during the evacuation of the tin, interrupting such suction and thereby causing the disc to be applied automatically to the pinhole to seal the latter, and then permanently affixing the disc over the pinhole by soldering or heat.

In testimony whereof I have signed my name to this specification.

HENRY JEFFREY POOLE.